United States Patent Office 3,427,445

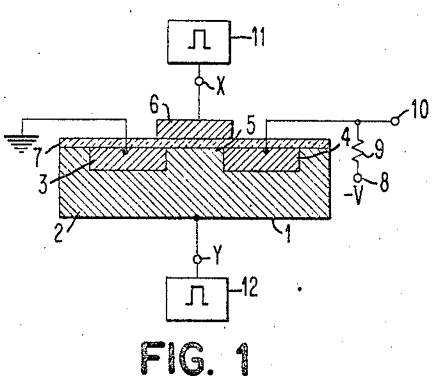
FIG. 1
| X | Y | 10 |
|---|---|---|
| 0 | 0 | 0 |
| 0 | 1 | 1 |
| 1 | 0 | 1 |
| 1 | 1 | 0 |
FIG. 2
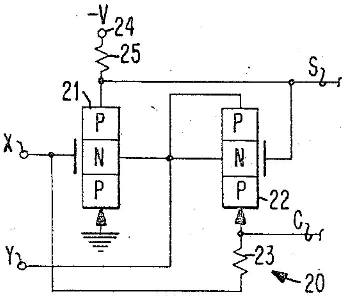
FIG. 3
| X | Y | S | C |
|---|---|---|---|
| 0 | 0 | 0 | 0 |
| 0 | 1 | 1 | 0 |
| 1 | 0 | 1 | 0 |
| 1 | 1 | 0 | 1 |
FIG. 4
INVENTOR
JACK R. DAILEY
BY John C Black
ATTORNEY

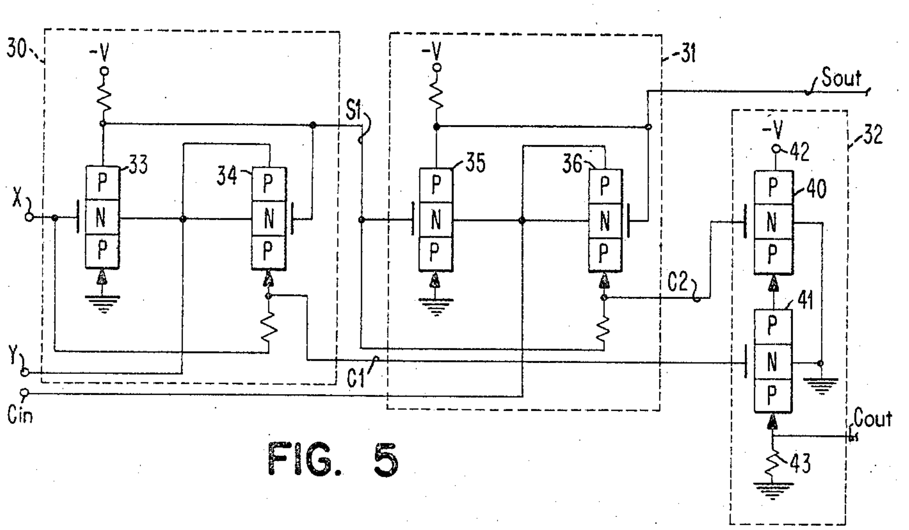
FIG. 5
| X | Y | S1 | C1 | Cin | Sout | C2 | Cout |
|---|---|---|---|---|---|---|---|
| 0 | 0 | 0 | 0 | 0 | 0 | 0 | 0 |
| 1 | 0 | 1 | 0 | 0 | 1 | 0 | 0 |
| 0 | 1 | 1 | 0 | 0 | 1 | 0 | 0 |
| 1 | 1 | 0 | 1 | 0 | 0 | 0 | 1 |
| 0 | 0 | 0 | 0 | 1 | 1 | 0 | 0 |
| 1 | 0 | 1 | 0 | 1 | 0 | 1 | 1 |
| 0 | 1 | 1 | 0 | 1 | 0 | 1 | 1 |
| 1 | 1 | 0 | 1 | 1 | 1 | 0 | 1 |
FIG. 6
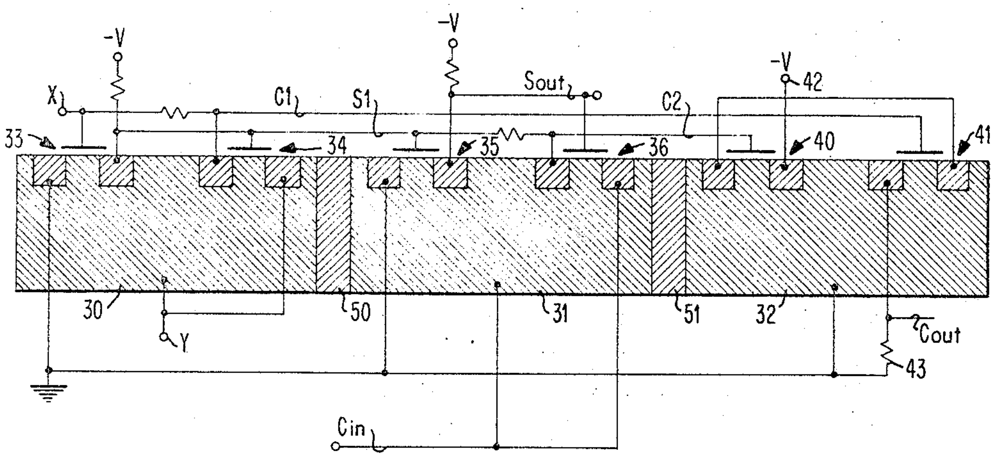
FIG. 7

Patented Feb. 11, 1969

3,427,445

FULL ADDER USING FIELD EFFECT TRANSISTOR OF THE INSULATED GATE TYPE

Jack R. Dailey, Apalachin, N.Y., assignor to International Business Machines Corporation, Armonk, N.Y., a corporation of New York Filed Dec. 27, 1965, Ser. No. 516,622

U.S. Cl. 235—175 7 Claims

Int. Cl. G06f *5/02, 7/42, 7/385*

ABSTRACT OF THE DISCLOSURE

An exclusive OR logical function is performed by a single field effect transistor of the insulated gate type having logical input signals applied to the gate and having additional logical input signals applied to the substrate region. A half adder function is achieved by suitable interconnection of two such field effect transistors; and a full adder function is achieved by suitable interconnection of two such half adder arrangements and a logical OR circuit comprising an additional pair of field effect transistors of the insulated gate type. The full adder can be fabricated on a single semiconductor chip.

This application relates generally to the operation of a field effect transistor of the insulated gate type by applying control signals to both the gate and to the substrate; and it more specifically relates to an improved exclusive OR circuit, half adder and full adder utilizing the above mode of operation.

One of the basic logical functions in almost all data processing apparatus is the exclusive OR circuit. It is frequently utilized in compare circuits, in half adders and in full adders. As is well known in the art, the exclusive OR function is characterized by a bivalued output signal which is forced to one level when both bivalued input signals are at one or the other of two levels and which is forced to the other level when the two input signals are at different levels.

The typical circuit configuration of exclusive OR circuits known is characterized by various combinations of basic AND and OR circuits or alternatively, a structure generally of the type shown in U.S. Patent No. 2,903,602, issued Sept. 8, 1959 to H. Fleisher. In known exclusive OR circuits, the function is obtained by the use of three or more active semiconductor devices. The cost of such circuits can be reduced by monolithic fabrication inasmuch as the per unit cost of semiconductor devices becomes low. However, even in monolithically fabricated devices it is still necessary to provide three or more active devices.

Accordingly, it is the primary object of the present invention to provide a low cost, yet reliable exclusive OR circuit.

This object is achieved in the preferred embodiment of the present invention by providing a field effect transistor of the insulated gate type, wherein input control signals are applied to both the gate and to the semiconductor substrate on which the device is formed. The field effect transistor may be a discrete element; however, it is particularly well adapted to the monolithic fabrication of several elements on a single semiconductor chip.

A field effect transistor of the insulated gate type is characterized by a substrate region of a semiconductor material of one conductivity type and a pair of diffused regions of the opposite conductivity type. The diffused regions are separated by a channel of substrate material which is very narrow in relation to its length. One of the diffused regions, i.e. the source, is connected to ground potential and the other diffused region, i.e. the drain, is connected to a source of operating potential by way of a load resistor. The operating potential is of a polarity which reverse biases the drain with respect to the substrate region.

The typical method of operating this type of transistor is to connect the substrate region to ground potential and to apply input signals alternatively at ground potential or at said operating potential level to operate the transistor in its high or low impedance state.

It has been observed that, when such a device is connected to a suitable source of operating potential and when input signals at a suitable potential level are selectively applied to the gate and to the substrate, the following action takes place, i.e. (1) with ground potential applied to either one of the substrate or gate terminals and a signal of the same polarity as said operating potential applied to the other terminal, a current path is completed from the source to the drain to change the level of the output voltage at the drain; (2) when ground potential is applied to both the gate and the substrate, the device exhibits an extremely high impedance, whereby the voltage level at the drain does not change; (3) when suitable potentials of the same polarity as said operating potential are applied to both the gate and the substrate, the device also exhibits an extremely high impedance, whereby the voltage level at the output terminal does not change.

Hence, a single active semiconductor device with four terminals provides the exclusive OR function.

It can be appreciated that with discrete components the savings in device costs are significantly reduced. The same can be said for a monolithic device having a plurality of elements, each isolated from each other since, for any functional requirement, the density of active devices is reduced at least by a factor of three.

Accordingly, it is another object of the present invention to provide a field effect transistor of the insulted gate type, wherein control signals are applied to both the gate and substrate terminals to achieve an exclusive OR function.

In this regard, it has been observed that, by applying signals of selected potential levels to the gate and substarte terminals, output signals in the nature of threshold levels can be achieved.

It is therefore a broader object of the present invention to provide a signal translating device characterized by a field effect transistor of the insulated gate type, wherein control signals are applied to both the gate and substrate terminals.

It is another object of the present invention to provide an improved half adder which is characterized by the use of two of said improved exclusive OR devices, suitably connected.

It is another object of the present invention to provide a full adder which is characterized by four of said improved exclusive OR devices and an OR circuit fabricated of field effect transistors of the insulated gate type, suitably connected.

The foregoing and other objects, features and advantages of the invention will be apparent from the following more particular description of preferred embodiments of the invention, as illustrated in the accompanying drawings.

In the drawings:

FIG. 1 diagrammatically illustrates the improved logical element;

FIG. 2 is a truth table illustrating the operation of the device of FIG. 1 as an exclusive OR circuit;

FIG. 3 is a schematic diagram of an improved half adder utilizing the improved device of FIG. 1;

FIG. 4 is a truth table illustrating the operation of the half adder of FIG. 3;

FIG. 5 is a schematic diagram of a full adder utilizing the improved device of FIG. 1;

FIG. 6 is a truth table illustrating the operation of the full adder of FIG. 5; and FIG. 7 diagrammatically illustrates the manner in which the full adder of FIG. 5 can be monolithically fabricated on a single semiconductor chip.

The field effect transistor 1 of FIG. 1 comprises a substrate region 2 of N-type semiconductor material and a source region 3 and drain region 4 which are of a P-type material diffused into the substrate. A narrow, elongated channel 5 of the substrate material is interposed between and isolates the source and drain regions. A metallic gate 6 is positioned above the channel and overlies the adjacent edges of the source and drain. A suitable insulating material 7 is interposed between and isolates the gate from the semiconductor regions.

The source region is connected to ground potential and the drain region is connected to a negative supply terminal 8 by way of an impedance 9. An output terminal 10 is connected to the junction between the impedance 9 and the drain region. First and second input terminals X and Y are connected respectively to the gate 6 and the substrate region 2. Input signal sources 11 and 12 are connected to the terminals X and Y.

It will be assumed that a logical "0" condition is represented by a negative potential and that a logical "1" condition is represented by ground potential.

It will be seen in FIG. 2 that when a logical "1" ground potential is applied to both the X and Y terminals, the negative potential at the terminal 8 will be applied to the output terminal 10, the transistor 1 presenting a high impedance between the source and drain regions.

When a logical "0" negative potential is applied to the X terminal and a logical "1" ground potential is applied to the Y terminal, the device 1 acts as a normal field effect transistor with a relatively low impedance path between the source and drain regions, i.e. the negative potential on the gate induces a positive region at the upper surface of the channel 5 to electrically connect the source and drain regions. The voltage at the output terminal 10 will be ground potential minus the low voltage drop across the source to drain path of the transistor.

In tests conducted on a field effect transistor, Model MEM 511, manufactured by General Instruments Corporation, a negative two-volt potential was used for the logical "0" levels and for the supply terminal 8; and negative output potentials in the order of two-tenths to three-tenths volt were observed when the transistor was in its low impedance state.

When a logical "1" ground potential is applied to the X terminal and the logical "0" negative potential is applied to the Y terminal, the transistor 1 is switched to its low impedance state, a low negative potential very close to ground potential being observed at the output terminal 10.

Patentee does not wish to be bound by a proposed explanation of the theory of operation involved with respect to this condition. However, the following is offered as a possible explanation. It is believed that with the gate at zero volts and terminal Y at a negative voltage, the field effect transistor acts in a manner somewhat similar to a conventional bipolar transistor, wherein the source, substrate and drain act in a manner similar to the emitter, base and collector electrodes of a bipolar transistor. When a forward bias potential is applied to the base-emitter electrodes of the conventional bipolar transistor, a low impedance path is produced between the emitter and collector electrodes. This same sort of transistor action appears to occur in the device of FIG. 1.

When logical "0" negative potentials are applied to both of the terminals X and Y, the effect produced by each input appears to cancel the effect produced by the other input signal, the transistor 1 remaining in its high impedance state; and a logical "0" output is obtained.

The logical "0" output is produced with equal potentials applied to both the X and Y terminals with suitable dimensioning and spacing of the source, drain and substrate and with suitable doping levels.

It has also been observed that when negative potentials of differing valves are applied to the X and Y terminals, threshold functions can be achieved.

Set forth below is a derivation of equations for current flow in an N-type substrate material showing the effects of doping level, potential difference, and dimensioning. Also, the equation for channel current is derived showing its dependence on potential, carrier mobility, oxide and dimensioning. Resistance of the semiconductor may be defined as:

$$R_s=\rho\frac{l}{tw}$$

where $l$=length of conduction path
$t$=thickness of material
$w$=width of material
$\rho$=resistivity of material From the law of electric neutrality, $N_d+p=N_a+n$ where $N_d$=number of donor atoms
$N_a$=number of acceptor atoms
$p$=hole concentration
$n$=electron concentration For an N-type substrate material $N_a=O$ and assuming $n>>p$ the law yields:

$$n\cong N_d$$

meaning that in the substrate the free electron concentration is directly proportional to the density of donor atoms which in turn is a function of the amount of substrate doping. The concentration of holes, $p$, in the substrate may be found from the mass action law $np=n_i^2$ where $n_i$=intrinsic concentration of the substrate. Therefore, $$p=\frac{(n_i)^2}{N_d}$$

Defining the conductivity of the material as the reciprocal of the resistivity yields:

$$\sigma=\frac{l}{\rho}=(n\mu_n+p\mu_p)q$$

where $n$=free electron concentration
$p$=free hole concentration
$\mu n$=electron mobility
$\mu p$=hole mobility
$q$=electron charge Substituting $$p=\frac{n_i^2}{N_d},\ n=N_d \qquad \sigma=(N_d^2\mu_n+n_i^2\mu_p)\frac{q}{N_d}$$

Further, defining conductance as the reciprocal of $R_s$ results in:

$$G_s=\left[(N_d^2\mu_n+n_i^2\mu_p)\frac{q}{N_d}\right]\left(\frac{tw}{\Delta l}\right)$$

for an infinitesimal length of material.

Also, the current may be expressed as $$I=G_s\Delta V=\left[(N_d^2\mu_n+n_i^2\mu_p)\frac{q}{N_d}\right]\frac{tw}{\Delta l}\Delta V$$

which may be rewritten as:

$$I=\left[(N_d^2\mu_n+n_i^2\mu_p)\frac{q}{N_d}\right]\left(\frac{tw}{l}\right)(V_l-V_{l=0}) \qquad (1)$$

where the term $V_1—V_{1\text{-}0}$=voltage across the length of material being measured.

This equation shows the dependence of conduction upon the doping level represented by the ionized donor atoms and also the dimensions of material length, thickness and width.

There is also conduction in the induced P-channel between source and drain. This P-channel can be assumed to have negligible thickness resulting in a surface sheet of induced charge, $\sigma s$. This assumption also means that the electric field will be normal to the channel surface. The surface charge, $Q/A$, can be expressed as $$\frac{Q}{A}=\epsilon_{ox}E_{ox}=\frac{\epsilon_{ox}}{t_{ox}}V_G$$

where $\Sigma_{OX}$=dielectric constant of silicon doioxide
$t_{OX}$=thickness of oxide
$E_{OX}$=electric field through the oxide
$V_G$=gate voltage
A=area of sheet=$wl$ The sheet conductivity may be expressed as:

$$\sigma_c=\frac{Q}{A}\mu_p$$

where $\mu_p$=effective carrier mobility.

The conductance of the induced channel, $$G_o=\sigma_c\frac{w}{l}$$

and $I_c=G_mV_G$ yielding $$I_d=\sigma_c\frac{w}{l}V_G=\left(\frac{\epsilon_{ox}}{t_{ox}}\mu_p\right)\left(\frac{w}{l}\right)V_G^2 \quad (2)$$

showing a square law relationship existing for current in the induced channel between source and drain. The dependence upon the oxide parameters, channel dimensions and carrier mobility is shown.

It appears that when a negative signal is applied to X, the conventional field effect action takes place according to Equation 2. Also, when a negative signal is applied to Y, carriers from the source are attracted from the source and are swept to the drain diffusion by transistor action. When both X and Y simultaneously have negative potentials applied, the number of majority carriers swept from the drain diffusion to the load resistor and drain supply voltage is reduced by a flow to the substrate terminal which effectively cancels the effect of X and causes the output to remain unchanged.

With selected levels of potential applied to the X and Y terminals it is possible to obtain at the output of the device a voltage V*o* such that for simultaneous inputs at X and Y, V*o* will represent a value of voltage greater than, equal to or less than the original voltage output with only one of the input signals applied. Also, the degree of change that the output assumes depends on the level of applied input potential. Specifically, with input X held constant, the input amplitude of Y can be adjusted to yield an output swing greater than, equal to or even less than (to a degree of cancellation if desired) the output signal observed due to input X alone.

Note that an exclusive OR-invert function is achieved by the device of FIG. 1 if ground potential and a negative potential are assigned the logical "0" and logical "1" values respectively.

The use of the exclusive OR device of FIG. 1 to form a half adder as shown in FIG. 3 will now be described. Preferably, each such exclusive OR device is suitably fabricated by known techniques so that the output level of each said device is at, or suitably close to, ground potential or alternatively at the negative supply potential in response to various input signals so that level setting circuits are not required between the devices.

The half adder 20 of FIG. 3 includes first and second field effect transistor devices 21 and 22. The transistor 21 is connected in the signal inverting mode; and the transistor 22, in the source follower mode. An AUGEND input terminal X is connected to the gate of the transistor 21 and to the source region of the transistor 22 by way of an impedance 23. It will be appreciated that in monolithic structures these impedances are often in the form of active devices. An ADDEND input terminal Y is connected to the substrate regions of both transistors and to the drain region of the transistor 22. The source region of the transistor 21 is connected to ground potential and its drain region is connected to a negative supply terminal 24 by way of an impedance 25. The drain region of the transistor 21 is also connected to a SUM output line S and to the gate of the transistor 22. A CARRY output line C is connected to the junction between the impedance 23 and the source region of the transistor 22.

With particular reference to the table of FIG. 4, it can be seen that when logical "0" negative potentials are applied to the X and Y input terminals, the SUM and CARRY output lines are at the logical "0" negative potential, the transistors 21 and 22 presenting high impedances between their source and drain regions.

When a logical "0" negative potential is applied to the X input terminal and a logical "1" ground potential is applied to the Y terminal, the transistor 21 is switched to its low impedance state to apply a logical "1" ground potential to the SUM output line S. With ground potential applied to the gate, substrate and drain regions of the transistor 22, the transistor will present a high impedance between its source and drain regions, whereby the negative potential at the input terminal X is applied to the CARRY output line C by way of the impedance 23.

When a logical "1" ground potential is applied to the X terminal and a logical "0" negative potential is applied to the Y terminal, the transistor 21 is switched to its low impedance state to apply a logical "1" ground potential to the SUM output line S. The transistor 22 is switched to its low impedance state by the negative potential at the input terminal Y to apply the logical "0" negative potential to the CARRY output line C by way of the drain to source path.

When logical "1" ground potential is applied to both input terminals X and Y, the transistor 21 is held off; however, the negative potential at the gate of the transistor 22 switches the latter to its low impedance state to apply a logical "1" ground potential to the CARRY output line C by way of the Y input terminal and the drain to source path of the transistor 22.

Attention is directed to the operation of transistor 22 for the last two operating conditions. In the former condition, the transistor 22 "turned on" to apply a negative potential to the line C; in the latter condition, the transistor 22 "turned on" to apply ground potential to the line C.

The full adder of FIG. 5 comprises a pair of half adder circuits 30 and 31, each of which is similar to that of FIG. 3, and a logical OR circuit 32. The half adder 30 includes input terminals X and Y and SUM and CARRY output lines S1 and C1 connected to field effect transistors 33 and 34.

The half adder 31 includes the input terminal S1, a CARRY input terminal C*in* and SUM and CARRY output lines S*out* and C2 connected to a pair of field effect transistors 35 and 36.

The OR circuit 32 comprises a pair of field effect transistors 40 and 41 of the insulated gate type. The drain region of the transistor 40 is connected to a negative supply terminal 42, its gate is connected to the line C2 and its source region is connected to the drain region of the transistor 41. The gate of the transistor 41 is connected to the line C1 and its source region is connected to a CARRY output line C*out* and to ground potential by way of a resistor 43. The substrate regions of the transistors 40 and 41 are connected to ground potential.

One suitable method of monolithically fabricating the full adder of FIG. 5 is illustrated in FIG. 7 diagrammatically. Thus the monolithic structure of FIG. 7 includes the half adders 30 and 31, separated by a suitable isolation barrier 50 of P material diffused into the semiconductor body. The half adder 31 is isolated from the OR circuit 32 by means of the barrier 51 of P material diffused into the semiconductor body. The various input/output terminals and lines of FIG. 7 have the same reference numerals as their corresponding terminals and lines in FIG. 6. The impedances have been shown as discrete components for ease of illustration; it will be appreciated that they are preferably formed on the monolithic chip in known manner.

The operation of the full adder of FIG. 5 is illustrated by the truth table of FIG. 6. With logical "0" negative potentials applied to the input terminals X, Y and Cin, the transistors 33 and 34 will be held off to apply logical "0" negative twelve-volt potentials to the lines S1 and C1. The negative potential on the conductor C1 forces the transistor 41 into its lower impedance condition. The negative potentials on the line S1 and the terminal Cin hold the transistors 35 and 36 off to apply logical "0" negative potentials to the SUM output line Sout and the CARRY output line C2. The negative potential on the conductor C2 forces the transistor 40 to its low impedance state to cause the negative potential at the terminal 42 to be applied to the CARRY output line Cout by way of transistors 40 and 41.

The transistors 33, 34, 35, 36, 40 and 41 are further controlled in accordance with the truth table of FIG. 6 to achieve the full adder function.

It will be appreciated that various modifications may be made. For example, the transistor 1 of FIG. 1 can be operated in the source follower mode mather than the invert mode by interposing the resistor 9 between the source 3 and ground and connecting output terminal 10 to the source 3.

Also NPN transistor types may be used with suitable signal and supply polarities.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a signal translating device of the type in which a field effect transistor of the insulated gate type has at least high and low impedance states and includes source, drain and substrate regions and a metallic gate electrically insulated from and overlying portions of all said regions;

in which a source of operating potential includes at least a pair of terminals; and in which first means connects the source and drain regions to respective operating potential terminals;

the improvement comprising means for applying input signals to the substrate region, and means for applying input signals to the gate to control the impedance state of the transistor.

2. The device of claim 1 wherein said second-mentioned means and said third-mentioned means selectively apply input signals of predetermined bivalued magnitudes to the substrate region and to the gate to perform an exclusive OR function.

3. The device of claim 1 wherein said second-mentioned means and said third-mentioned means selectively apply input signals of predetermined bivalued magnitudes to the substrate region and to the gate to perform an exclusive OR-invert function.

4. A logical circuit for providing a half adder function comprising a first field effect transistor of the insulated gate type having at least high and low impedance states and including first source, drain and substrate regions and a first gate;

a source of operating potential including at least a pair of terminals;

first means connecting the first source and drain regions to respective operating potential terminals;

a second field effect transistor of the insulated gate type having its drain and substrate regions connected to the first substrate region, having its gate connected to the first drain region and having a source region;

impedance means connecting the later source region to the first gate; and second means for applying ADDEND and AUGEND signals of predetermined bivalued magnitudes, one signal being applied to the first gate and the other being applied to the first substrate region to operate the transistors as a half adder.

5. A logical circuit for providing a full adder function comprising a first field effect transistor of the insulated gate type having at least high and low impedance states and including first source, drain and substrate regions and a first gate;

a source of operating potential including at least a pair of terminals;

means connecting the first source and drain regions to respective operating potential terminals;

a second field effect transistor of the insulated gate type having second drain and substrate regions connected to the first substrate region, having a second gate connected to the first drain region and having a second source region;

impedance means connecting the second source region to the first gate;

third and fourth field effect transistors of the insulated gate type having third and fourth gates and third and fourth source, drain and substrate regions;

means connecting the third source and drain regions to said operating potential terminals;

said third gate being connected to the first drain region;

impedance means connecting the fourth source region to the third gate;

the fourth drain and substrate regions being connected to the third substrate region, a CARRY input connected to the junction between the third and fourth substrate regions and the fourth drain region;

a SUM output;

said fourth gate being connected to the third drain region and to the SUM output;

a logical OR circuit including fifth and sixth field effect transistors of the insulated gate type having fifth and sixth drain and source regions connected in a series circuit between the operating potential terminals and having fifth and sixth gates connected respectively to the fourth source region and the second source region;

a CARRY output connected to the sixth source region; and

ADDEND and AUGEND inputs connected respectively to the first gate and to the junction between the first substrate region and the second drain and substrate regions to operate the transistors as a full adder.

6. The full adder of claim 5 wherein at least the transistors are monolithically fabricated on a single semiconductor chip.

7. A logical circuit for providing a full adder function comprising a first field effect transistor of the insulated gate type having at least high and low impedance states and including first source, drain and substrate regions and a first gate;

a source of operating potential including at least a pair of terminals;

means connecting the first source and drain regions to respective operating potential terminals;

a second field effect transistor of the insulated gate type having second drain and substrate regions connected to the first substrate region, having a second gate connected to the first drain region and having a second source region;

impedance means connecting the second source region to the first gate;

third and fourth field effect transistors of the insulated gate type having third and fourth gates and third and fourth source, drain and substrate regions;

means connecting the third source and drain regions to said operating potential terminals;

said third gate being connected to the first drain region;

impedance means connecting the fourth source region to the third gate;

the fourth drain and substrate regions being connected to the third substrate region, a CARRY input connected to the junction between the third and fourth substrate regions and the fourth drain region;

a SUM output;

said fourth gate being connected to the third drain region and to the SUM output;

a logical OR circuit including inputs connected to the fourth source region and to the second source region and having a CARRY output, and ADDEND and AUGEND inputs connected respectively to the first gate and to the junction between the first substrate region and the second drain and substrate regions to operate the transistors as a full adder.

References Cited

UNITED STATES PATENTS

| | | | |
|---|---|---|---|
| 3,201,574 | 8/1965 | Szekely | 235—175 |
| 3,215,861 | 11/1965 | Sekely | 307—88.5 |
| 3,250,917 | 5/1966 | Hofstein | 307—88.5 |
| 3,252,011 | 5/1966 | Zuk | 307—88.5 |
| 3,267,295 | 8/1966 | Zuk | 307—88.5 |
| 3,299,291 | 1/1967 | Warner et al. | 307—88.5 |
| 3,305,708 | 2/1967 | Ditrick | 317—234 |

MARTIN P. HARTMAN, *Primary Examiner.*

U.S. Cl. X.R.

235—173, 176; 307—216, 205